(12) United States Patent
Kim et al.

(10) Patent No.: US 7,466,750 B2
(45) Date of Patent: Dec. 16, 2008

(54) APPARATUS FOR CHANNEL EQUALIZATION USING MULTI ANTENNA AND METHOD THEREOF

(75) Inventors: Byoung Gill Kim, Seoul (KR); In Hwan Choi, Seoul (KR); Kyung Won Kang, Seoul (KR); Yong Hak Suh, Seoul (KR); Woo Chan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 606 days.

(21) Appl. No.: 11/116,629

(22) Filed: Apr. 27, 2005

(65) Prior Publication Data

US 2006/0034362 A1 Feb. 16, 2006

(30) Foreign Application Priority Data

Aug. 12, 2004 (KR) .................. 10-2004-0063471

(51) Int. Cl.
 H03H 7/30 (2006.01)
 H03H 7/40 (2006.01)
 H03K 5/159 (2006.01)
(52) U.S. Cl. .............. 375/233; 375/232; 375/260; 375/349; 708/322; 708/323
(58) Field of Classification Search ......... 375/229–234, 375/350, 260, 349; 708/322, 323
See application file for complete search history.

(56) References Cited

U.S. PATENT DOCUMENTS 5,689,528 A * 11/1997 Tsujimoto .................. 375/233
7,218,666 B2 * 5/2007 Baum et al. ................ 375/148

FOREIGN PATENT DOCUMENTS

KR 1020040044831 5/2004
KR 1020040053412 6/2004

* cited by examiner

*Primary Examiner*—Phuong Phu
(74) *Attorney, Agent, or Firm*—Lee, Hong, Degerman, Kang & Waimey

(57) ABSTRACT

The present invention provides an apparatus for channel equalization and method thereof, by which a digital signal received via a plurality of antennas is equalized. The present invention includes receiving digital transmission signals using a plurality of antennas, respectively, initializing equalizer coefficients and equalizing the received signals respectively, adding the equalized signals together, predicting a noise amplified in the equalizing step, and generating a final output signal by removing the predicted noise from a value resulting from adding the equalized signals together. Therefore, the present invention performs equalization using a plurality of antennas, thereby enhancing the signal to noise ratio of the final output and facilitating the equalization of the severely distorted channel.

28 Claims, 8 Drawing Sheets

APPARATUS FOR CHANNEL EQUALIZATION USING MULTI ANTENNA AND METHOD THEREOF

This application claims the benefit of the Korean Application No. 10-2004-0063471 filed on Aug. 12, 2004 which is hereby incorporated by reference.

BACKGROUND OF THE INVENTION

1. Field of the Invention

The present invention relates to channel equalization, and more particularly, to an apparatus for channel equalization and method thereof, by which a digital signal received via a plurality of antennas is equalized.

2. Discussion of the Related Art

Generally, a digital transceiver system maps digital information (e.g., voice, data and video) of a transmitter into symbols, converts each of the symbols to an analog signal proportional to a size or phase, and then transmits the analog signal to a receiver over a transport channel.

In doing so, interfering with signals passing through the transport channel of multi-path, the signal arriving at the receiver is severely distorted. Hence, an equalizer is needed for channel compensation to restore an original signal from the distorted received signal.

Currently, as an equalizer mostly adopted by a receiver for a single carrier transmission system such as the U.S. terrestrial broadcasting, there is a decision feedback equalizer.

The decision feedback equalizer, which has less noise increment and includes an infinite impulse response (IIR) filter, is advantageous in compensating signal distortion due to a time delay corresponding to length of the filter but is disadvantageous in a problem of instability due to incorrect decision.

To compensate such a disadvantage, a predictive decision feedback equalizer (pDFE) provided with a linear filter only has been proposed, which is explained with reference to FIG. 1 as follows.

FIG. 1 is a block diagram of a predictive decision feedback equalizer according to a related art.

Referring to FIG. 1, a predictive decision feedback equalizer consists of a linear filter equalizer 111, a noise predictor 114, an error generator 112, and a decision device 115.

The above-configured predictive decision feedback equalizer performs linear equalization on an input signal u(n) by the linear equalizer 111 to obtain a signal x(n) and removes a noise amplified in the equalization step by n(n) predicted by the noise predictor 114 to obtain a final result of y(n).

In doing so, the predictive decision feedback equalizer regards a difference between a value d(n) resulting from deciding y(n) as one of predefined values and the equalized value x(n) as an equalization error e(n) and then performs adaptive equalization.

The noise predictor 114 predicts a noise with the equalized x(n) and the d(n) to find the n(n).

The predictive decision feedback equalizer acts as a substitute for noise reduction obtained in using a decision feedback filter. Yet, the predictive decision feedback equalizer needs a longer filter to equalize distortion of an area such as a decision feedback equalizer because of using the linear feedforward filter only.

In case of receiving broadcasting in the urban center or room, signal interference brings about strong distortion. Hence, a feedforward filter needs a considerably long length to linearly equalize the strong distortion.

If a linear equalizer is implemented in a time domain, hardware complexity is raised considerably high. If the LMS (least mean square) method is used as adaptive algorithm, a filter length is elongated so that a channel variation speed that the equalizer can follow up is more lowered.

Hence, a method enabling the linear equalizer in a frequency domain has been proposed, which is shown in FIG. 2.

FIG. 2 is a block diagram of a frequency domain linear adaptive equalizer according to a related art.

Referring to FIG. 2, an input data u(n) is overlapped by an overlap unit 211 and a signal U(k) of a frequency domain is found using a FFT (fast Fourier transform) unit 212. In this case, 'k' is a frequency index corresponding to 1~N when time data is transformed into a frequency data using N-point FFT.

The data U(k) of the frequency domain passes through a conjugate operation unit 213 and a power normalizer 214 to be converted to $U'^H(k)$. In this case, conjugate operation and power normalizing operation are carried out regardless of operational sequence. So, the conjugate and power normalization operations can be simultaneously carried out.

The power normalizing operation is to achieve normalization by distributing data with power corresponding to each frequency index of signals. By the power normalizing operation, a different coefficient update quantity is given to each frequency index.

Meanwhile, zeros amounting to an overlapped quantity of the data u(n) is added to an input error e(n) of time domain by a zero padding unit 226. And, the error e(n) is then transformed into an error value E(k) of the frequency domain by an FFT unit 225.

The error value E(k) is multiplied by $U'^H(k)$ in a multiplier 215. The result is multiplied by a step-size μ to be added to a coefficient $W^{(t)}(k)$ of a current time t, whereby a coefficient $W^{(t+1)}(k)$ of a next time (t+1) is found.

Thereafter, the data U(k) of the frequency domain is multiplied by an equalizer coefficient W(k) for equalization to be outputted. And, the corresponding output is inversely transformed into to a value in a time domain by an IFFT (inverse fast Fourier transform) unit 223. A save unit 224 having received an output value from the IFFT unit 223 discards overlapped data but takes valid data to obtain a final result x(n).

A case that there is no coefficient update restriction is taken as an example for the above-explained channel equalization process. Yet, if coefficient update restriction is put on an equalizer, an operation procedure within a dotted line in FIG. 2 is additionally needed. In the configuration of the equalizer having the coefficient update restriction, a value resulting from multiplying the error E(k) in the frequency domain by the data $U'^H(k)$ is transformed into a value in the time domain through IFFT operation. A coefficient update range is limited in the time domain (a coefficient to be updated in the time domain remains intact but the rest is turned into zero). The corresponding value is then moved to the frequency domain through FFT operation to generate a size to update the coefficient in the frequency domain.

Meanwhile, in order to equalize a signal experiencing a dynamic channel having fast variation, an equalizer having a fast adaptive speed is needed. There exists a difference between a channel speed an equalizer can converge and a traceable speed after the convergence in general. To raise the convergence speed, a method of initializing an equalizer according to a channel status is needed. So, an initialization-enabling frequency domain linear adaptive equalizer that enables initialization has been proposed, which is explained with reference to FIG. 3 as follows.

FIG. 3 is a block diagram of an initialization-enabling frequency domain linear adaptive equalizer according to a related art.

Referring to FIG. 3, in an initialization-enabling frequency domain linear adaptive equalizer, information additionally needed to initialize a coefficient of an equalizer is channel impulse response (CIR).

Hence, c(m) is found by presuming a channel before equalizing initial reception data of signal reception. And, zero is padded into the c(m) by a zero padding unit 312 to correspond to a data FFT size. In this case, 'm' is an index according to a presumed channel response time.

An output value of the zero padding unit 312 is transformed into a value of the frequency domain by an FFT unit 314 to find a frequency domain response C(k) of the channel. The C(k) becomes an initial coefficient value $W^{(o)}(k)$ of an equalizer by finding a frequency response of a inverse channel using a ROM 315. A coefficient is then initialized using the initial coefficient value. An adaptive equalization procedure after initialization is executed by the same manner explained in FIG. 2.

However, the related art equalizer linearly equalizes the signal according to the antenna path using one antenna only and removes the noise amplified in the equalizing process using the noise predictor. So, like the case that a signal reflected via various paths of the urban center, the indoor space and the like is received, noise amplification is raised in the channel having severe distortion. Hence, it is difficult to compensate signal distortion in the related art equalizer.

SUMMARY OF THE INVENTION

Accordingly, the present invention is directed to an apparatus for channel equalization and method thereof that substantially obviate one or more problems due to limitations and disadvantages of the related art.

An object of the present invention is to provide an apparatus for channel equalization and method thereof, by which a distorted signal is compensated using a plurality of antennas.

Another object of the present invention is to provide an apparatus for channel equalization and method thereof, by which equalization is performed in a frequency domain using a plurality of antennas.

Another object of the present invention is to provide an initialization-enabling frequency domain equalizer, in which an equalizer receiving a plurality of antenna signals is initialized using a channel impulse response.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a channel equalizing method using a multi antenna according to the present invention includes the steps of receiving digital transmission signals using a plurality of antennas, respectively, equalizing the received signals respectively, adding the equalized signals together, predicting a noise amplified in the equalizing step, and generating a final output signal by removing the predicted noise from a value resulting from adding the equalized signals together.

Preferably, the channel equalizing step includes the steps of outputting a decision value closest to the amplified-noise-removed signal by receiving the final output signal and generating an error signal to output to the equalizing step by receiving a value resulting from subtracting the equalized signal from the decision value.

More preferably, in the noise predicting step, the amplified noise is linearly predicted by the decision value and the equalized signal together.

In another aspect of the present invention, a channel equalizing method using a multi antenna includes the steps of receiving digital transmission signals using a plurality of antennas, respectively, equalizing the received signals respectively in a frequency domain, adding the equalized signals in the frequency domain together, and transforming the added signal into a time domain signal.

Preferably, the channel equalizing method further includes the steps of predicting a noise amplified in the equalizing step and generating a final output signal by removing the predicted noise from the time domain signal.

Preferably, the channel equalizing method further includes the steps of outputting a decision value closest to the amplified-noise-removed signal by receiving the final output signal and generating an error signal to output to the equalizing step by receiving a value resulting from subtracting the equalized signal from the decision value.

Preferably, the channel equalizing method further includes the steps of by receiving the error signal, padding zero amounting to an overlapped quantity of the received signal into the error signal and transforming the zero-padded error signal of the time domain into a frequency-domain signal to output to the equalizing step.

More preferably, the error signal is singly used regardless of the number of the antennas.

More preferably, the one frequency domain equalizing step includes the steps of transforming the received signal into the frequency domain, updating a coefficient of the frequency-domain-transformed signal, and outputting an equalized frequency domain signal by multiplying the updated coefficient by the frequency-domain-transformed signal.

More preferably, the coefficient updating step includes the steps of performing a conjugate operation on the frequency-domain-transformed signal, performing a power normalizing operation on the conjugate-operated signal, multiplying the power-normalized signal by the error signal of the frequency domain, multiplying the multiplied signal by a step size, and performing a coefficient update by adding a previously stored prior coefficient to the multiplied signal.

More preferably, the frequency domain equalizing step further includes a coefficient update restriction step.

In another aspect of the present invention, a channel equalizing method using a multi antenna includes the steps of receiving digital transmission signals using a plurality of antennas, respectively, computing an initial equalizer coefficient value to maximize a signal to noise ratio by presuming transport channel impulse responses from the signals received via a plurality of the antennas and by receiving a frequency domain channel impulse response value transformed from each of the transport channel impulse responses, performing channel equalization on the received signal using the signal transformed into the frequency domain from the received signal and the initial coefficient value, by keeping performing coefficient update by being fed back with the channel-equalized signal, performing channel equalization using the updated coefficient value and the received signal, adding outputted signals equalized in the frequency domain together, and transforming the added signal into a time domain.

Preferably, the initial coefficient computing step includes the steps of finding conjugates by receiving presumed frequency-domain channel impulse response values from the signals received via a plurality of the antennas and by performing conjugate operations on the received values, respectively, multiplying the presumed frequency-domain channel impulse response values by the conjugates, respectively, adding all the multiplied values and a noise to signal ratio, receiving the added value and transforming the received value to an inverse channel response value using a ROM inverse table, and outputting the initial equalizer coefficient value by multiplying the transformed value by each of the found conjugates.

In another aspect of the present invention, a channel equalizing apparatus using a multi antenna includes a plurality of frequency domain equalizers using a plurality of antennas to receive signals transmitted from a digital transceiver system, a plurality of the frequency domain equalizers equalizing the signals received via a plurality of the antennas in a frequency domain to output, respectively, an adder adding the frequency-domain-equalized signals outputted from a plurality of the frequency domain equalizers together, and an IFFT unit transforming an output signal of the adder into a time domain.

In a further aspect of the present invention, a channel equalizing apparatus using a multi antenna includes a plurality of antennas receiving signals transmitted from a digital transceiver system, an initial coefficient calculator computing an initial equalizer coefficient value to maximize a signal to noise ratio by presuming channel impulse responses from the signals received via a plurality of the antennas and by receiving a frequency domain channel impulse response value transformed from each of the channel impulse responses, a plurality of channel equalizers performing channel equalization on the received signal using the signal transformed into the frequency domain from the received signal and the initial coefficient value, a plurality of the channel equalizers keeping performing coefficient update by being fed back with the channel-equalized signal and performing channel equalization using the updated coefficient value and the received signal, an adder adding outputted signals equalized by a plurality of the frequency domain equalizers in the frequency domain together, and an IFFT unit transforming an output signal of the adder into a time domain.

Therefore, by the present invention, channel equalization is performed using a plurality of the antennas, whereby a signal to noise ratio of a final output is enhanced and whereby a signal of a severely distorted channel is easily equalized.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Besides, the terms used in the present invention are mainly selected from currently usable global and general terms. Yet, most appropriate terms are arbitrarily used by the applicant to keep up with the appearance of new technologies. And, the meanings of the arbitrarily used terms will be clearly explained in the corresponding description. Hence, in apprehending the present invention, the present invention should be understood not by the simple names of the terms but by the meanings of the terms.

Figure 4:
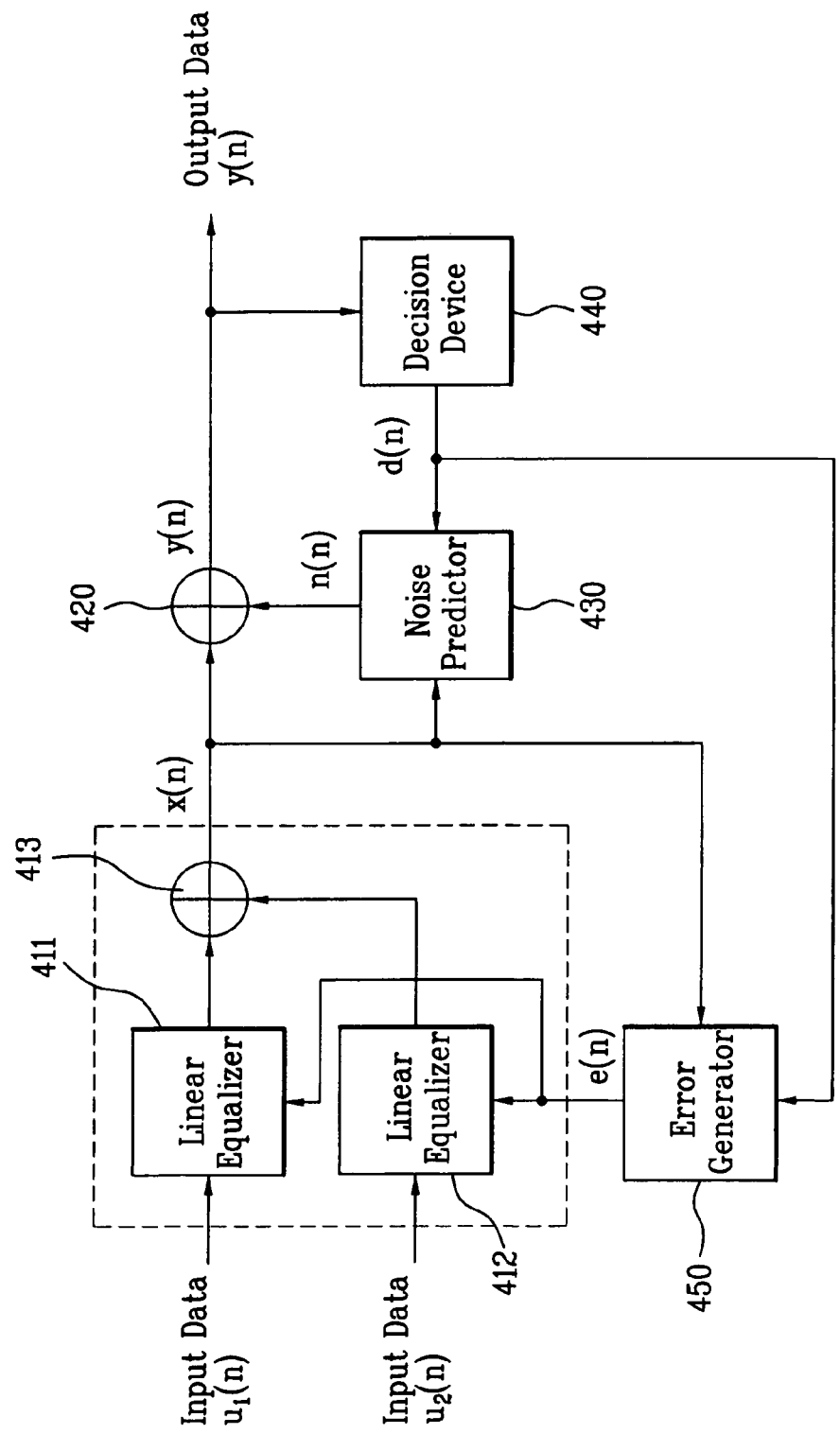
FIG. 4 is a block diagram of a predictive decision feedback equalizer using multi antenna according to the present invention.

FIG. 4 is a block diagram of a predictive decision feedback equalizer using multi-antenna according to the present invention.

Referring to FIG. 4, a predictive decision feedback equalizer (pDFE) according to the present invention performs equalization using a plurality of linear equalizers 411 and 412 and then performs addition on the result using an adder 413.

Namely, the linear equalizers 411 and 412 are additionally provided as many as antennas to add respectively equalized signals together. FIG. 4 exemplarily shows a configuration using two antennas.

An operational relation of the above-configured predictive decision feedback equalizer using multi-antenna is explained as follows.

First of all, x(n) is found by adding a value resulting from performing linear equalization on an input data $u_1(n)$ inputted via a first antenna and a value resulting from performing linear equalization on an input data $u_2(n)$ inputted via a second antenna together. And, n(n) predicting a noise amplified in the process of the linear equalization is removed from the x(n) to find a final result y(n).

In this case, an error e(n) used in equalizer adaptation is made by receiving a value d(n) decided as one of values decided as closest to the signal of which amplification noise is removed from the final result value y(n) and by using blind algorithm in an error generator 450.

And, adaptation is performed though correlation between the error and the data of each of the equalizers using the made error e(n). Moreover, a noise predictor 430 finds the n(n) by linearly predicting the noise amplified in the equalizer with the equalizer output x(n) and the decision value d(n).

If the number of antennas is equal to or greater than 3, linear equalizers are additionally provided as many as the antennas. All results are added together to find one equalized signal. Error is computed to adapt the entire linear equalizers with one error.

Thus, in case of using a plurality of antennas, signals of a plurality of the antennas are added together to output a result signal and equalizers are then adapted to the antennas, respectively using one error. Hence, the relatively better signal is more reflected in the result.

Hence, noise amplification occurring in case of using a plurality of antenna signals becomes smaller than the noise amplification occurring in compensating a severely distorted signal using one antenna only, whereby a signal to noise ratio of a final output is enhanced. Therefore, a signal of a severely distorted channel can be easily equalized.

Thus, the multi-antenna equalizer output x(n) can be found by equalizing the signals inputted from the antennas, respectively and then by adding the results together. Yet, if it is implemented as a frequency-domain equalizer, a block usable in common is generated to provide a gain to a hardware area. This is explained with reference to FIG. 5 as follows.

Figure 5:
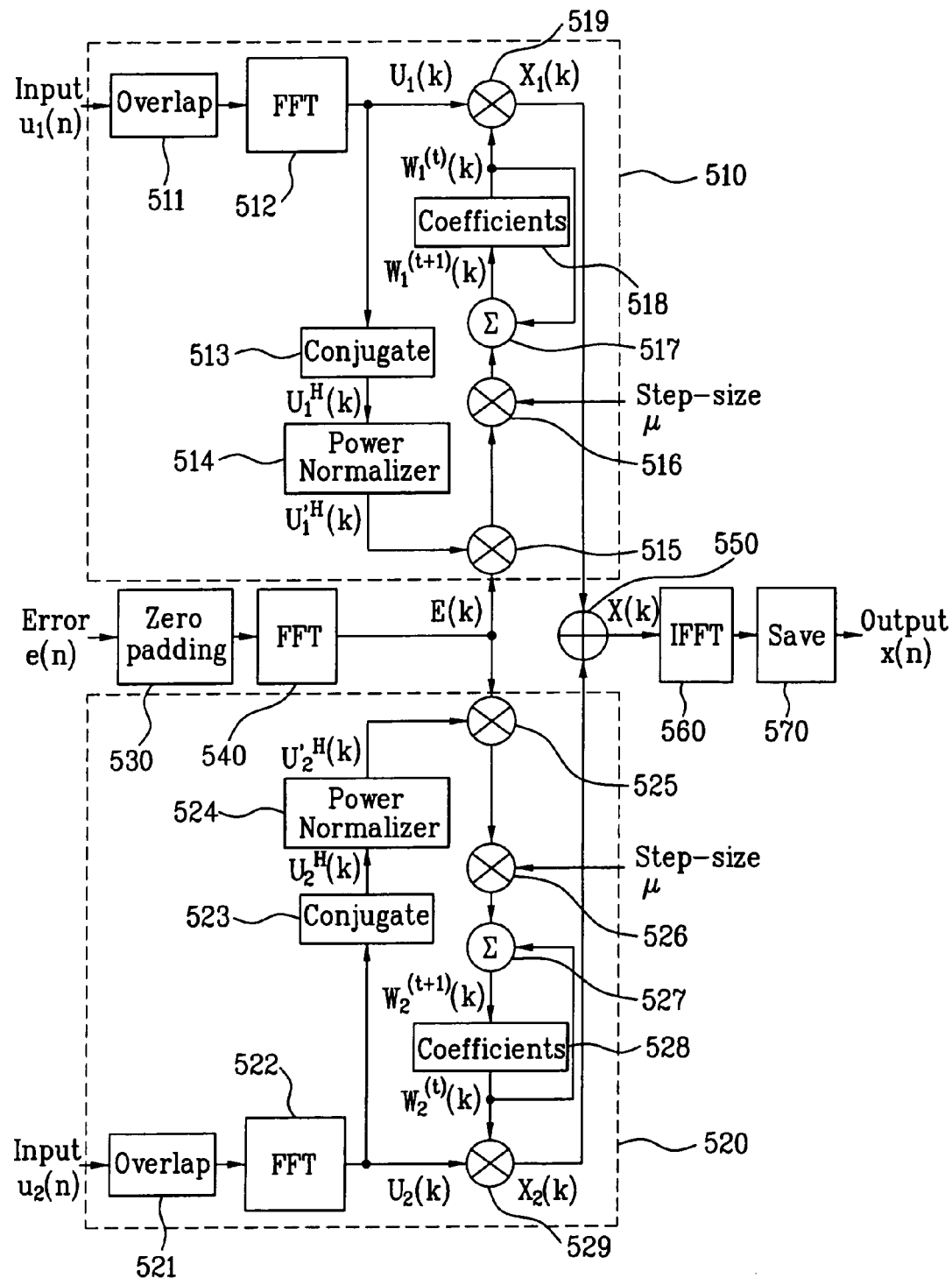
FIG. 5 is a block diagram of a frequency domain linear adaptive equalizer using multi antenna according to the present invention.

FIG. 5 is a block diagram of a frequency domain linear adaptive equalizer using multi antenna according to the present invention.

Referring to FIG. 5, in a configuration of a frequency domain linear adaptive equalizer according to the present invention, equalization is carried out using one error e(n) only regardless of the number of antennas. Hence, a zero padding unit 530 and an FFT (fast Fourier transform) unit 540 receive the error e(n) to perform zero padding and transformation into a frequency domain once to find E(k) regardless of the number of antennas.

Assuming that the number of antennas is 'L', $U_1(k)$ to $U_L(k)$ are found by performing FFT operation on $u_1(n)$ to $u_L(n)$ through data overlapping for transformation into the frequency domain, respectively.

The $U_1(k)$ to $U_L(k)$ are multiplied by $W_1(k)$ to $W_L(k)$ to find equalizer outputs $X_1(k)$ to $X_L(k)$, respectively. The outputs are then added together to provide the frequency domain response X(k) of the equalizer output.

In doing so, an operational procedure of finding $X_1(k)$ using $U_1(k)$ and $W_1(k)$, which is one of operational procedures according to the respective antenna paths, is explained as follows.

First of all, the data $U_1(k)$ of the frequency domain passes through a conjugate operation unit 513 and a power normalizer 514 to be converted to $U_1^{\prime H}(k)$. The conjugate operation and power normalizing operation are carried out regardless of operational sequence. So, the conjugate and power normalization operations can be simultaneously carried out.

The power normalizing operation is to achieve normalization by distributing data with power corresponding to each frequency index of signals. By the power normalizing operation, a different coefficient update quantity is given to each frequency index.

Meanwhile, zeros amounting to an overlapped quantity of the data u(n) is added to an input error e(n). And, the zero-padded error is then transformed into an error value E(k) of the frequency domain. The error value E(k) is multiplied by $U_1^{\prime H}(k)$ in a multiplier 515.

The result is multiplied by a step-size μ to be added to a coefficient $W_1^{(t)}(k)$ of a current time t, whereby a coefficient $W_1^{(t+1)}(k)$ of a next time (t+1) is found. The value $W_1^{(t+1)}(k)$ is then stored in a coefficients bank 518.

In doing so, LMS (least mean square) adaptive algorithm is used in the coefficient update. And, a scheme of updating the coefficient using the LMS algorithm is called an LMS coefficient update scheme.

The coefficients bank 518 outputs the previously stored coefficient $W_1^{(t)}(k)$ of the current time t to a multiplier 519. The multiplier 519 multiplies the frequency-domain data $U_1(k)$ by the equalizer coefficient $W_1^{(t)}(k)$ to output an equalized output value $X_1(k)$.

Hence, the signal $u_1(n)$ inputted from one antenna is equalized to be outputted as $X_1(k)$. By using such a method according to the present invention, the signals inputted from a plurality (L) of the antennas are equalized by the equalizers to output $X_1(k)$ to $X_L(k)$, respectively. The $X_1(k)$ to $X_L(k)$ are added together by the adder 550 to be outputted.

The value resulting from adding the outputs together becomes the frequency-domain response X(k) of the output of the frequency-domain linear adaptive equalizer using the multi antenna according to the present invention. The equalizer output X(k) is transformed again into the time domain by an IFFT (inverse fast Fourier transform) unit 560. By discarding overlapped data from the output value of the IFFT unit 560 and by taking valid data from the output value of the IFFT unit 560, a final result value x(n) is found.

Figure 1:
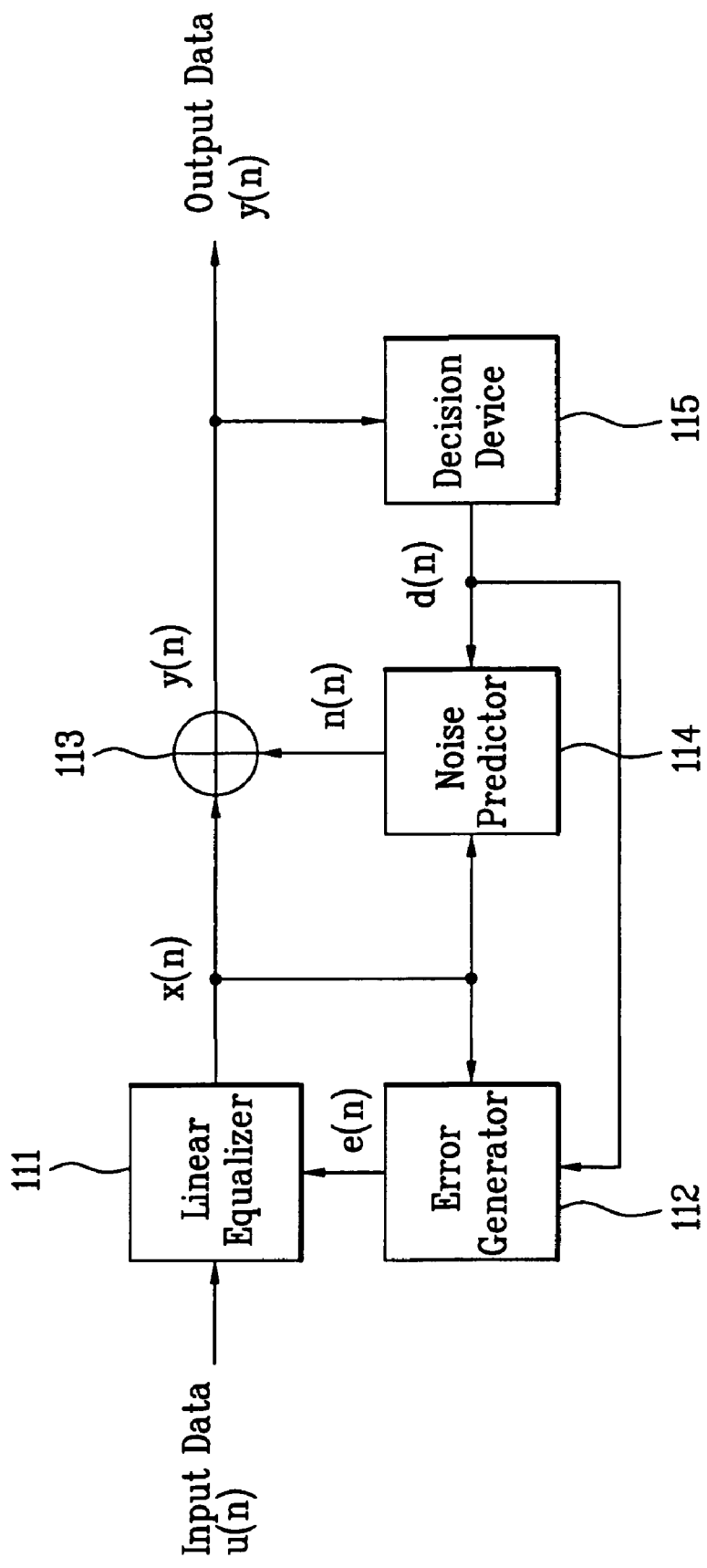
FIG. 1 is a block diagram of a predictive decision feedback equalizer according to a related art.
Figure 2:
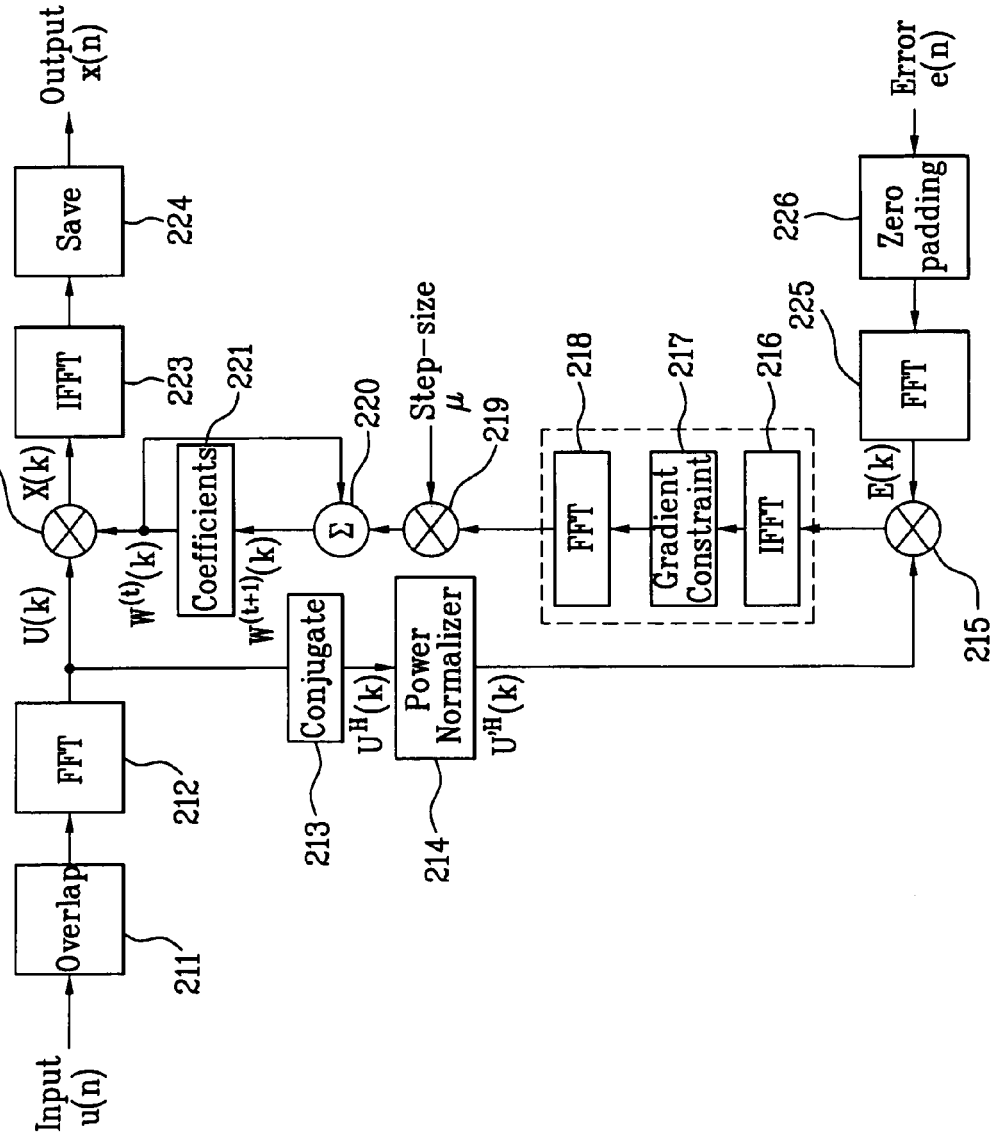
FIG. 2 is a block diagram of a frequency domain linear adaptive equalizer according to a related art.
Figure 3:
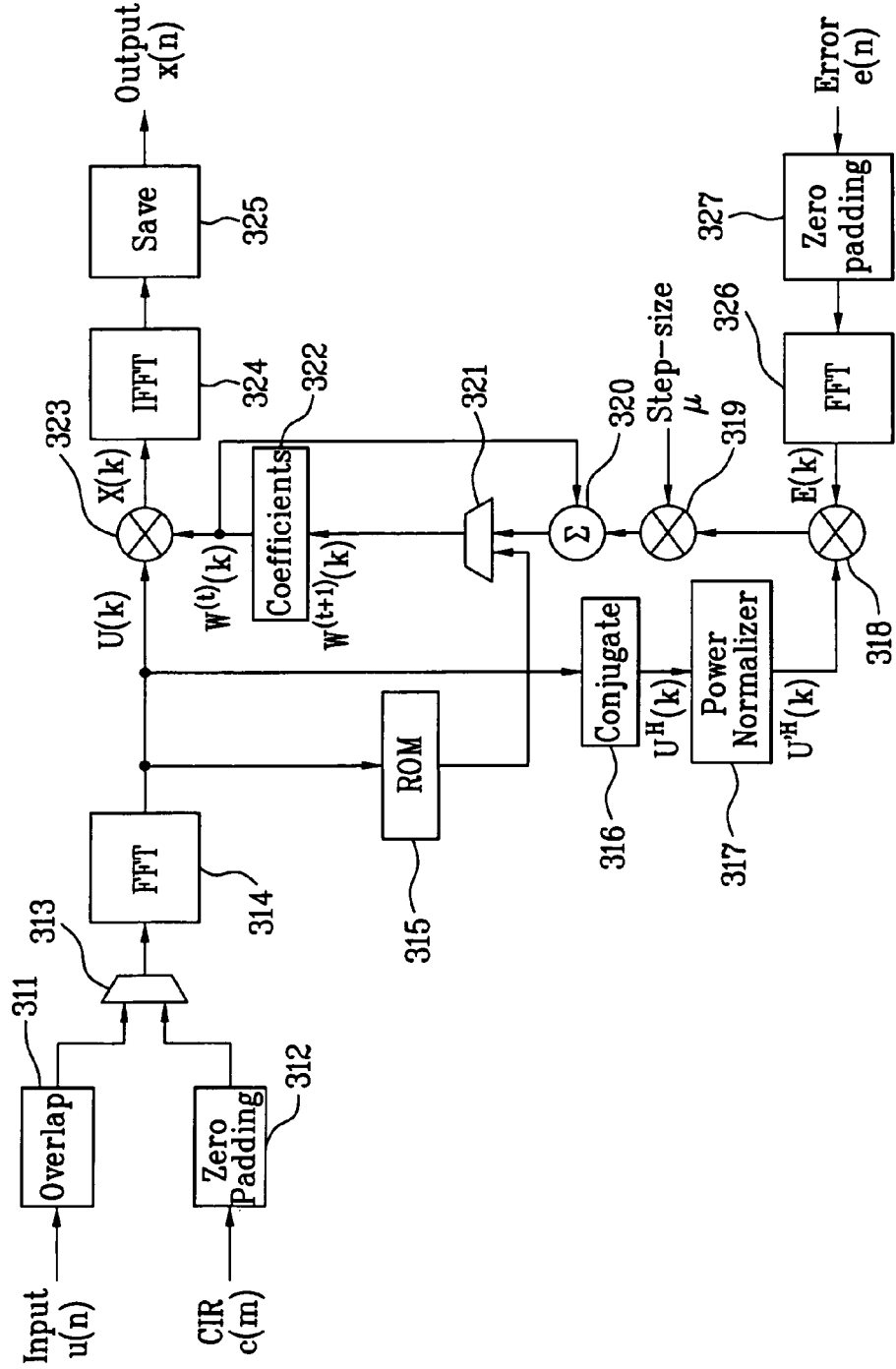
FIG. 3 is a block diagram of an initialization-enabling frequency domain linear adaptive equalizer enabling initialization according to a related art.

Meanwhile, it is apparent that the coefficient update restriction explained in FIG. 2 is applicable to the frequency domain linear adaptive equalizer using the multi antenna according to the present invention by taking the technical background of the present invention.

An initialization method according to a channel status in the frequency domain linear adaptive equalizer according to the present invention and a configuration thereof are explained with reference to FIG. 6 as follows.

Figure 6:
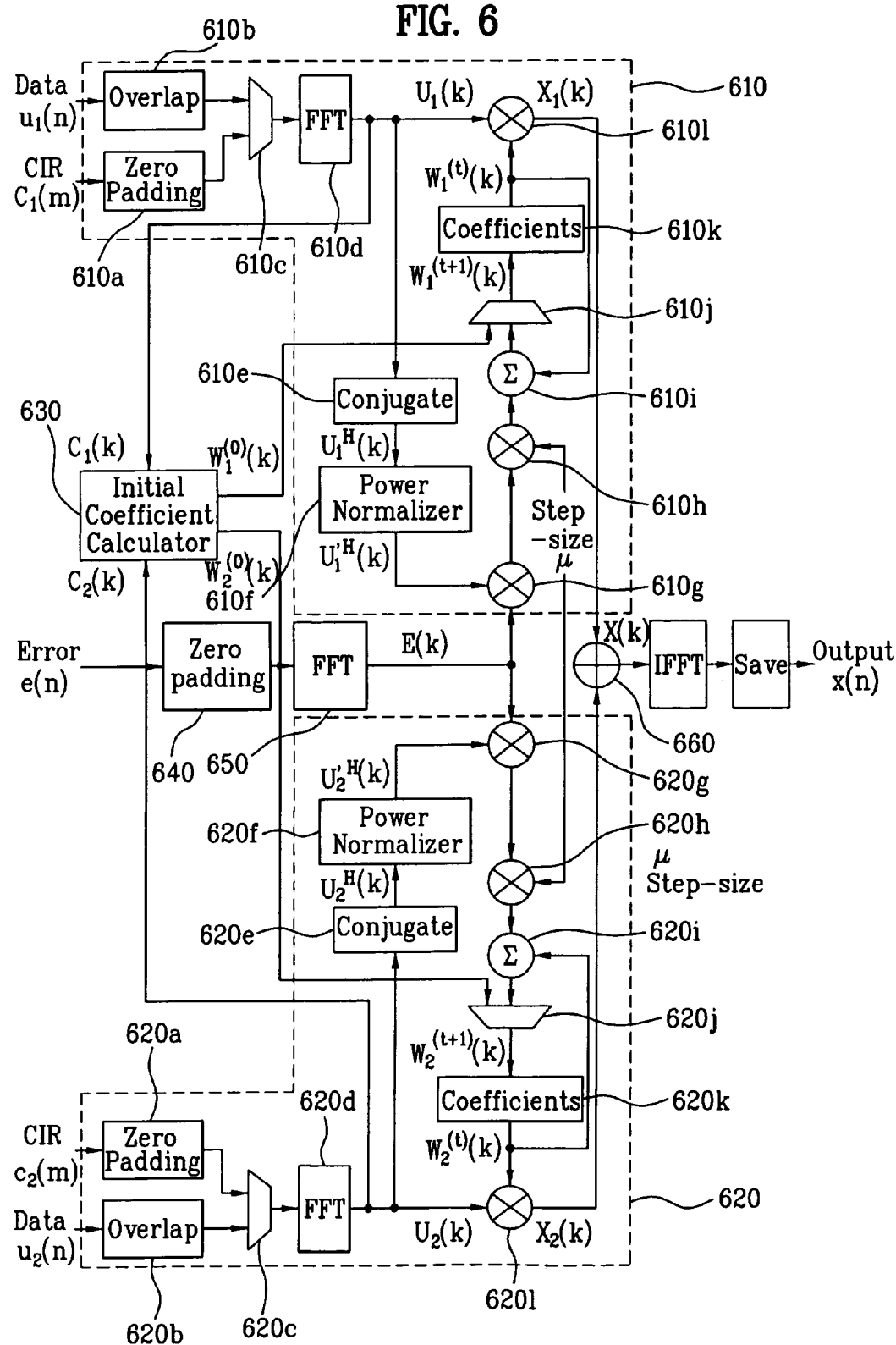
FIG. 6 is a block diagram of an initialization-enabling frequency domain linear adaptive equalizer using multi antenna according to the present invention.

FIG. 6 is a block diagram of an initialization-enabling frequency domain linear adaptive equalizer using multi-antenna according to the present invention.

Referring to FIG. 6, an initialization-enabling frequency domain linear adaptive equalizer using multi-antenna according to the present invention finds an initial value not by using a separate channel response per antenna reception path but by calculating an equalizer coefficient to maximize a signal to noise ratio using an initial coefficient calculator 630.

Namely, by generating an initial equalizer coefficient from the initial coefficient calculator 630 and by inputting the initial equalizer coefficient to linear equalizers 610 and 620 (a case of using two antennas in FIG. 6 for example) as many as antennas to selectors (Mux) 610j and 620j, initialization is performed to select the initial equalizer coefficient according to a selection of the selector 610j or 620j.

In doing so, an input value to the initial coefficient calculator 630 is a frequency domain response C(k) of a channel necessary for initializing an equalizer coefficient. The C(k) is found in a manner of zero is padding to a channel impulse response value c(m) presumed in an early stage of signal reception to correspond to a FFT size and performing FFT (fast Fourier transform) thereon.

The another benefit of a combined frequency-domain equalizer for multi-antenna is that it is easy to obtain the equalizer initial coefficient. A configuration of the initial coefficient calculator 630 for the initial coefficient calculation is shown in FIG. 7.

Figure 7:
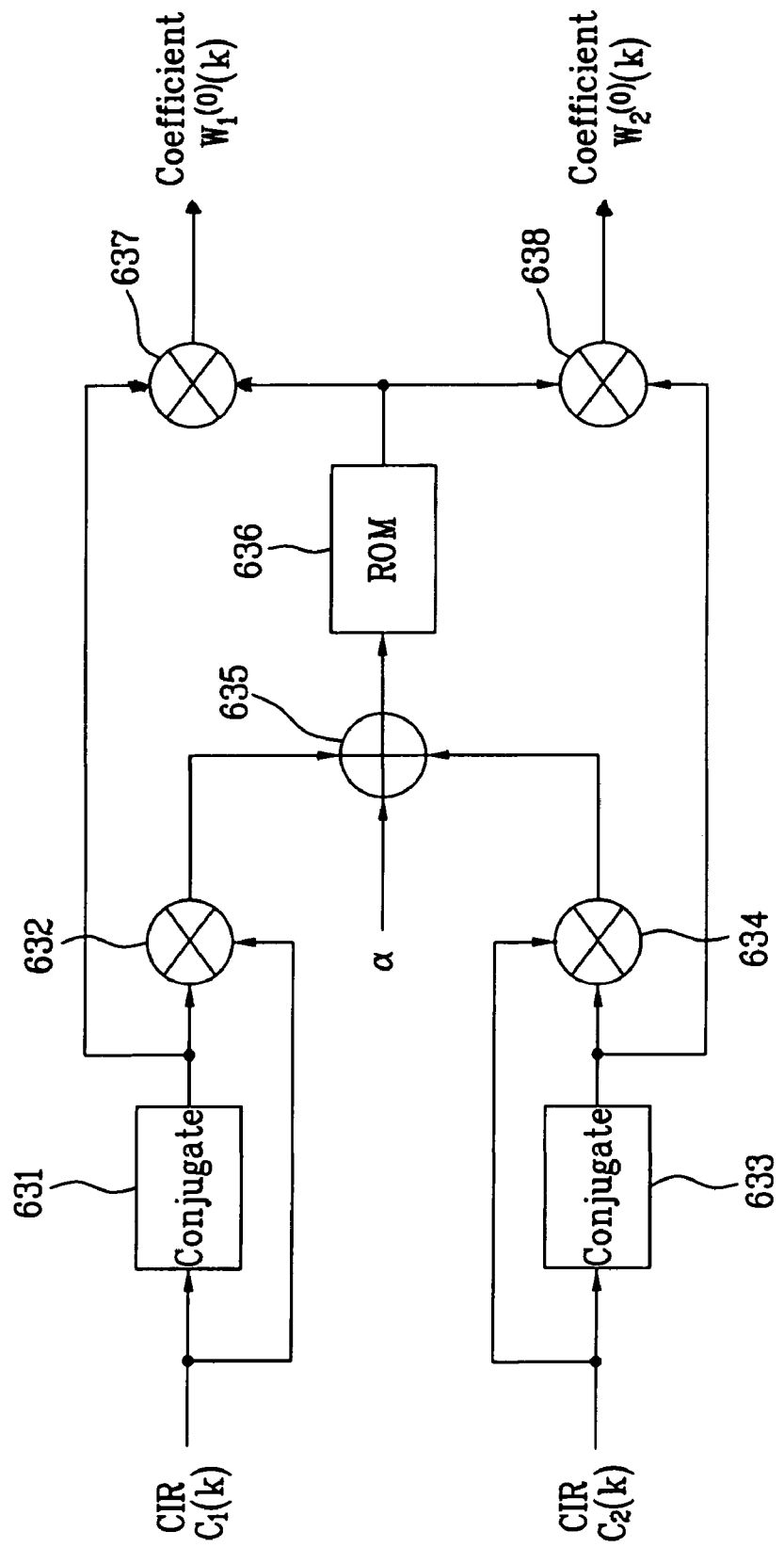
FIG. 7 is a block diagram of an initial coefficient calculator according to the present invention.

FIG. 7 is a block diagram of an initial coefficient calculator according to the present invention, in which two antennas are used and in which an initial equalizer coefficient of a frequency domain is found using channel responses.

Referring to FIG. 7, conjugates of frequency domain channel responses $C_1(k)$ and $C_2(k)$ of input signals are found by conjugate operation units 631 and 633, respectively. The $C_1(k)$ and $C_2(k)$ are multiplied by their conjugates by multipliers 632 and 634, respectively to be outputted. And, each of the output values is added to a signal to noise ratio α by an adder 635.

An output value of the adder 635 is inverted arithmetically using a ROM inverse table. And, the inverted value is multiplied again by each of the found conjugates by another multipliers 637 and 638 to be outputted. Hence, initial equalizer coefficients $W_1^{(0)}(k)$ and $W_2^{(0)}(k)$ are found. Such a relation is summarized in Formula 1.

$$W_1^{(0)}(k) = \frac{C_1^*(k)}{\alpha + \sum_{i=1}^{L} |C_{i(k)}|^2}$$ [Formula 1]

In Formula 1, '1' is an antenna index, 'L' is the number of antennas, $C_1^{(k)}$ is a frequency-domain channel response of a signal from an $1^{th}$ antenna, 'k' is a frequency index corresponding to 1 to N when N-point FFT is performed on a channel response, and 'α' is a noise to signal ratio.

An initial coefficient of a frequency domain expressed by Formula 1 is found by equalization in a manner of performing MRC (maximal ratio combining) on a signal in a frequency domain in viewpoint of minimum mean-squared error.

Hence, in an overall equalizer operation, signals equalized through initial coefficient $W_1^{(0)}(k)$ found using channel responses in the early stage are added together. And, X(k) corresponds to a total of the signals equalized using the initial coefficient $W_1^{(0)}(k)$ is a signal having a maximal signal to noise ratio.

Thus, after finding the initial coefficient and after the equalization using the coefficient, each coefficient $W_1(k)$ is updated by LMS scheme to be added together. Hence, the equalized signal X(k) can be expressed by Formula 2.

$$X(k) = \sum_{l=0}^{L} W_l(k) U_l(k)$$ [Formula 2]

In Formula 2, $U_1(k)$ means a frequency signal of the data inputted through the $1^{th}$ antenna and $W_1(k)$ means a coefficient updated by the LMS scheme.

Meanwhile, like the case in FIG. 6, the initialization-enabling frequency domain linear equalizer using two antennas is expandable in case of using three antennas as mentioned in FIG. 5. And, the coefficient update restriction is applicable in the same manner.

Figure 8:
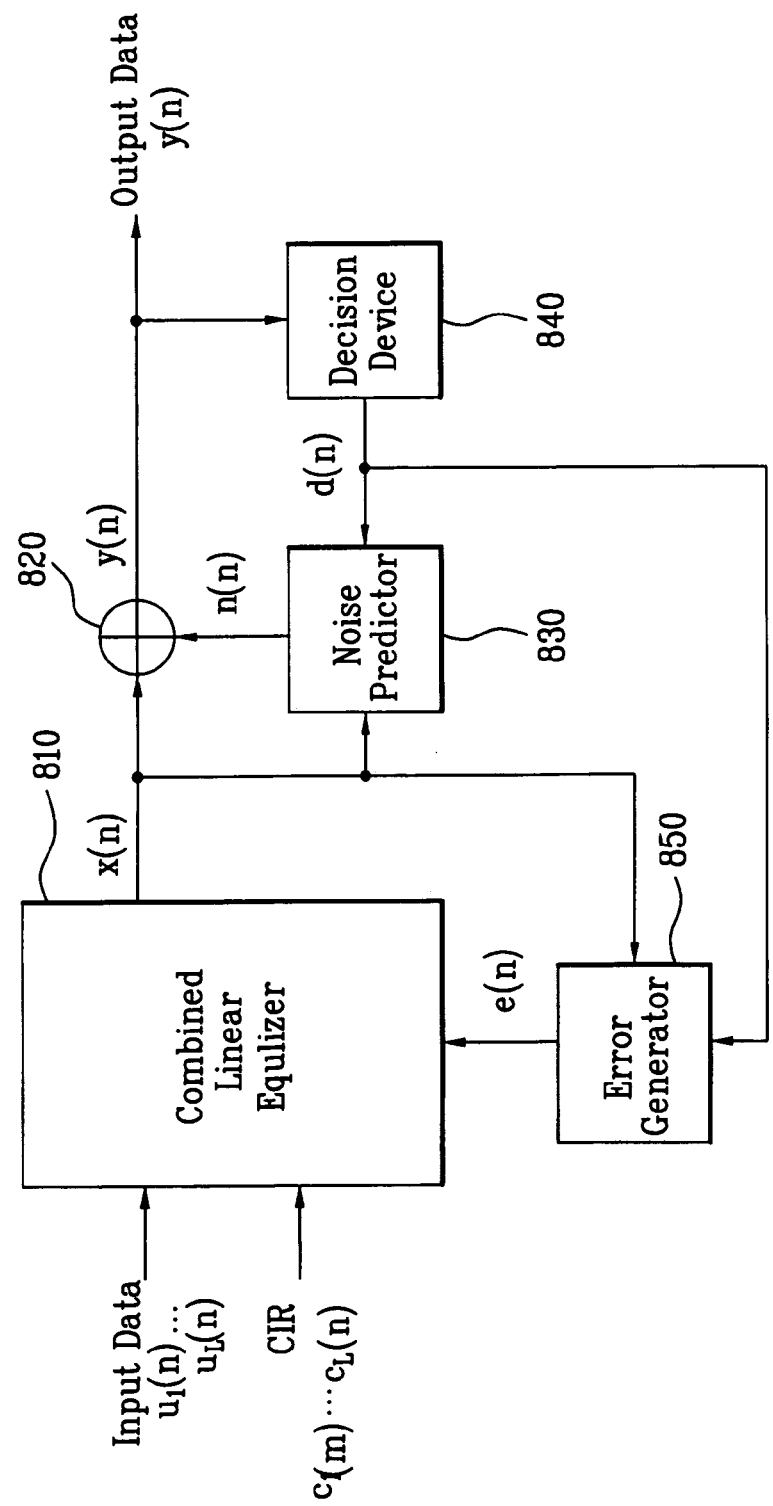
FIG. 8 is an overall block diagram of an initialization-enabling frequency domain linear adaptive equalizer using multi-antenna according to the present invention.

FIG. 8 is an overall block diagram of an initialization-enabling frequency domain linear adaptive equalizer using multi-antenna according to the present invention.

Referring to FIG. 8, signals $u_1(n)$ to $u_L(n)$ received through antennas and their presumed channel responses $c_1(m)$ to $c_L(m)$ are inputted to a combined linear equalizer 810 according to the present invention. The combined linear equalizer 810 finds an initial coefficient in the same manners explained in FIG. 6 and FIG. 7 and then updates the coefficient by LMS to find an equalized value x(n).

An amplified noise mixed in the equalized value x(n) is removed with n(n) predicted by a noise predictor 830 to find a final result y(n). In doing so, an error e(n) used for equalizer adaptation is found by an error generator 850 using the equalizer output x(n) and a value d(n) decided by a decision device 840.

Accordingly, the channel equalizer using the multi antenna according to the present invention provides the following advantages or effects.

First of all, the predictive decision feedback equalizer according to the present invention performs equalization using a plurality of antennas, thereby enhancing the signal to noise ratio of the final output and facilitating the equalization of the severely distorted channel.

Secondly, the present invention performs equalization in the frequency domain using a plurality of antennas, thereby reducing the hardware area to enhance efficiency of the equalizer.

Finally, the present invention initializes the equalizer receiving a plurality of antenna signals using the channel impulse response, thereby initializing the equalizer having a plurality of antennas.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A channel equalizing method using a multi antenna, comprising the steps of:
   receiving digital transmission signals using a plurality of antennas, respectively;
   equalizing the received signals respectively in a frequency domain;
   adding the equalized signals in the frequency domain together;
   transforming the added signal into a time domain signal;
   predicting a noise amplified in the equalizing step; and
   generating a final output signal by removing the predicted noise from the time domain signal.

2. The channel equalizing method of claim 1, further comprising the steps of:
   outputting a decision value closest to the amplified-noise-removed signal by receiving the final output signal; and
   generating an error signal to output to the equalizing step by receiving a value resulting from subtracting the equalized signal from the decision value.

3. The channel equalizing method of claim 2, further comprising the steps of:
   by receiving the error signal, padding zero amounting to an overlapped quantity of the received signal into the error signal; and
   transforming the zero-padded error signal of the time domain into a frequency-domain signal to output to the equalizing step.

4. The channel equalizing method of claim 3, wherein the error signal is singly used regardless of the number of the antennas.

5. The channel equalizing method of claim 3, the one frequency domain equalizing step comprising the steps of:
   transforming the received signal into the frequency domain;
   updating a coefficient of the frequency-domain-transformed signal; and
   outputting an equalized frequency domain signal by multiplying the updated coefficient by the frequency-domain-transformed signal.

6. The channel equalizing method of claim 5, the coefficient updating step comprising the steps of:
   performing a conjugate operation on the frequency-domain-transformed signal;

performing a power normalizing operation on the conjugate-operated signal;

multiplying the power-normalized signal by the error signal of the frequency domain;

multiplying the multiplied signal by a step size; and performing a coefficient update by adding a previously stored prior coefficient to the multiplied signal.

7. The channel equalizing method of claim 5, the frequency domain equalizing step further comprising a coefficient update restriction step.

8. A channel equalizing method using a multi antenna, comprising the steps of:

receiving digital transmission signals using a plurality of antennas, respectively;

computing an initial equalizer coefficient value to maximize a signal to noise ratio by presuming channel impulse responses from the signals received via a plurality of the antennas and by receiving a frequency domain channel impulse response value transformed from each of the transport channel impulse responses;

performing channel equalization on the received signal using the signal transformed into the frequency domain from the received signal and the initial coefficient value;

by keeping performing coefficient update by being fed back with the channel-equalized signal, performing channel equalization using the updated coefficient value and the received signal;

adding outputted signals equalized in the frequency domain together; and transforming the added signal into a time domain.

9. The channel equalizing method of claim 8, further comprising the steps of:

predicting a noise amplified in the equalizing step; and generating a final output signal by removing the predicted noise from the signal transformed into the time domain from the equalized signal.

10. The channel equalizing method of claim 8, further comprising the steps of:

outputting a decision value closest to the amplified-noise-removed signal by receiving the final output signal; and generating an error signal to output to the equalizing step by receiving a value resulting from subtracting the equalized signal from the decision value.

11. The channel equalizing method of claim 10, further comprising the steps of:

by receiving the error signal, padding zero amounting to an overlapped quantity of the received signal into the error signal; and transforming the zero-padded error signal of the time domain into a frequency-domain signal to output to the equalizing step.

12. The channel equalizing method of claim 11, wherein the error signal is singly used regardless of the number of the antennas.

13. The channel equalizing method of claim 11, the one frequency domain equalizing step comprising the steps of:

transforming the received signal into the frequency domain;

updating a coefficient of the frequency-domain-transformed signal; and outputting an equalized frequency domain signal by multiplying the updated coefficient by the frequency-domain-transformed signal.

14. The channel equalizing method of claim 13, the coefficient updating step comprising the steps of:

performing a conjugate operation on the frequency-domain-transformed signal;

performing a power normalizing operation on the conjugate-operated signal;

multiplying the power-normalized signal by the error signal of the frequency domain;

multiplying the multiplied signal by a step size; and performing a coefficient update by adding a previously stored prior coefficient to the multiplied signal.

15. The channel equalizing method of claim 13, the frequency domain equalizing step further comprising a coefficient update restriction step.

16. The channel equalizing method of claim 8, the initial coefficient computing step comprising the steps of:

finding conjugates by receiving presumed channel impulse response values from the signals received via a plurality of the antennas and by performing conjugate operations on the received values, respectively;

multiplying the presumed channel impulse response values by the conjugates, respectively;

adding all the multiplied values from antenna paths and a noise to signal ratio value;

receiving the added value and transforming the received value to an inverse channel response value using a ROM inverse table; and outputting the initial equalizer coefficient value by multiplying the transformed value by each of the found conjugates.

17. A channel equalizing apparatus using a multi antenna, comprising:

a plurality of frequency domain equalizers using a plurality of antennas to receive signals transmitted from a digital transceiver system, a plurality of the frequency domain equalizers equalizing the signals received via a plurality of the antennas in a frequency domain to output, respectively;

an adder adding the frequency-domain-equalized signals outputted from a plurality of the frequency domain equalizers together;

an IFFT unit transforming an output signal of the adder into a time domain;

a noise predictor predicting a noise amplified in an equalizing process; and a subtracter generating a final output signal by removing the noise predicted by the noise predictor from the time-domain-transformed signal from the equalized signal.

18. The channel equalizing apparatus of claim 17, the channel equalizer comprising:

a decision device outputting a decision value closest to the amplified-noise-removed signal by receiving the final output signal; and an error generator generating an error signal by receiving the decision value and the equalized signal to output the generated error signal to a plurality of the equalizers.

19. The channel equalizing apparatus of claim 18, the cannel equalizer comprising:

a zero padding unit padding zeros amounting to an overlapped quantity of the received signal into the error signal by receiving the error signal; and a FFT unit transforming the zero-padded error signal of a time domain into the frequency domain to output to a plurality of the frequency domain equalizers.

20. The channel equalizing apparatus of claim 19, the frequency domain equalizer comprising:

a FFT unit transforming the received signal into the frequency domain;

a conjugate operation unit performing a conjugate operation on the frequency-domain-transformed signal;

a power normalizer performing a power normalization operation on the conjugate-operated signal;

a first multiplier multiplying an output value of the power normalizer by the error signal of the frequency domain;

a second multiplier multiplying an output signal of the first multiplier by a step size;

a coefficient bank storing and outputting updated coefficients;

an adder performing a coefficient update by adding an output of the second multiplier and a previous coefficient fed back from the coefficient bank together and outputting the updated coefficient to the coefficient bank; and a third multiplier outputting an equalized frequency domain signal by multiplying the coefficient outputted from the coefficient bank by the frequency-domain-transformed received signal.

21. The channel equalizing apparatus of claim 20, the frequency domain equalizer further comprising a coefficient update restricting unit for coefficient update restriction.

22. A channel equalizing apparatus using a multi antenna, comprising:

a plurality of antennas receiving signals transmitted from a digital transceiver system;

an initial coefficient calculator computing an initial equalizer coefficient value to maximize a signal to noise ratio by presuming channel impulse responses from the signals received via a plurality of the antennas and by receiving a frequency domain channel impulse response value transformed from each of the channel impulse responses;

a plurality of channel equalizers performing channel equalization on the received signal using the signal transformed into the frequency domain from the received signal and the initial coefficient value, a plurality of the channel equalizers keeping performing coefficient update by being fed back with the channel-equalized signal and performing channel equalization using the updated coefficient value and the received signal;

an adder adding outputted signals equalized by a plurality of the frequency domain equalizers in the frequency domain together; and an IFFT unit transforming an output signal of the adder into a time domain.

23. The channel equalizing apparatus of claim 22, further comprising:

a noise predictor predicting a noise amplified in an equalizing process; and a subtracter generating a final output signal by removing the noise predicted by the noise predictor from the time-domain-transformed signal from the equalized signal.

24. The channel equalizing apparatus of claim 23, further comprising:

a decision device outputting a decision value closest to the amplified-noise-removed signal by receiving the final output signal; and an error generator generating an error signal by receiving the decision value and the equalized signal to output the generated error signal to a plurality of the equalizers.

25. The channel equalizing apparatus of claim 24, further comprising:

a zero padding unit padding zeros amounting to an overlapped quantity of the received signal into the error signal by receiving the error signal; and a FFT unit transforming the zero-padded error signal of a time domain into the frequency domain to output to a plurality of the frequency domain equalizers.

26. The channel equalizing apparatus of claim 25, the frequency domain equalizer comprising:

a FFT unit transforming the received signal and the presumed channel impulse response value into the frequency domain;

a conjugate operation unit performing a conjugate operation on the frequency-domain-transformed received signal;

a power normalizer performing a power normalization operation on the conjugate-operated signal;

a first multiplier multiplying an output value of the power normalizer by the error signal of the frequency domain;

a second multiplier multiplying an output signal of the first multiplier by a step size;

a coefficient bank storing and outputting updated coefficients;

an adder performing a coefficient update by adding an output of the second multiplier and a previous coefficient fed back from the coefficient bank together;

a selector selecting either the initial coefficient computed by the initial coefficient calculator or the updated coefficient to output to the coefficient bank; and a third multiplier outputting an equalized frequency domain signal by multiplying the coefficient outputted from the coefficient bank by the frequency-domain-transformed received signal.

27. The channel equalizing apparatus of claim 26, the frequency domain equalizer further comprising a coefficient update restricting unit for coefficient update restriction.

28. The channel equalizing apparatus of claim 22, the initial coefficient calculator comprising:

a conjugate operation unit finding conjugates by receiving presumed channel impulse response values from the signals received via a plurality of the antennas and by performing conjugate operations on the received values, respectively;

a plurality of multipliers multiplying the presumed channel impulse response values by the conjugates, respectively;

an adder adding all the multiplied values from antenna paths and a noise to signal ratio value;

a ROM receiving an output value from the adder and transforming the received value to a inverse channel response value using a ROM inverse table and a plurality of multipliers outputting the initial equalizer coefficient values by multiplying the transformed values by the found conjugates, respectively.

* * * * *